(12) United States Patent
Bell et al.

(10) Patent No.: US 7,797,295 B2
(45) Date of Patent: Sep. 14, 2010

(54) USER CONTENT FEEDS FROM USER STORAGE DEVICES TO A PUBLIC SEARCH ENGINE

(75) Inventors: Ronald S. Bell, Menlo Park, CA (US);
Oliver M. Raskin, Portland, OR (US);
Duke T. Fan, San Jose, CA (US); Chris T. Kalaboukis, Los Gatos, CA (US);
Ronald G. Martinez, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 512 days.

(21) Appl. No.: 11/650,194

(22) Filed: Jan. 4, 2007

(65) Prior Publication Data

US 2008/0168048 A1 Jul. 10, 2008

(51) Int. Cl.
*G06F 17/30* (2006.01)

(52) U.S. Cl. .................. 707/705; 707/706; 707/708; 707/709; 707/711; 707/726

(58) Field of Classification Search .................. 707/1, 707/7, 9, E17.017, E17.031, 705, 706, 708, 707/709, 711, 726, 783
See application file for complete search history.

(56) References Cited

U.S. PATENT DOCUMENTS

| | | | |
|---|---|---|---|
| 6,334,145 B1 * | 12/2001 | Adams et al. | 707/E17.114 |
| 6,701,329 B1 * | 3/2004 | Esibov et al. | 707/201 |
| 2002/0078045 A1 * | 6/2002 | Dutta | 707/7 |
| 2003/0115116 A1 * | 6/2003 | Crampton | 705/27 |
| 2004/0220791 A1 * | 11/2004 | Lamkin et al. | 703/11 |
| 2005/0246627 A1 * | 11/2005 | Sayed | 709/203 |
| 2007/0185860 A1 * | 8/2007 | Lissack | 707/5 |
| 2007/0208746 A1 * | 9/2007 | Koide et al. | 707/9 |
| 2008/0059255 A1 * | 3/2008 | Birkby | 705/7 |
| 2008/0103900 A1 * | 5/2008 | Flake et al. | 705/14 |

* cited by examiner

*Primary Examiner*—Mohammad Ali
*Assistant Examiner*—Thuy (Tiffany) Bui
(74) *Attorney, Agent, or Firm*—Hickman Palermo Truong & Becker LLP

(57) ABSTRACT

Allowing unhosted user content feeds to a public search engine, such as a web search engine, involves a user easily identifying a file as a file the user wants to share with others by, for example, storing the file in a particular directory folder on the user's device. Once identified, the file is scanned and a corresponding entry is inserted into a search index. The storage location on the user's device may be captured, and that information added to the search index for linking to the stored file. The file may be uploaded to a caching server, for serving either primarily from the caching server or secondarily from the caching server when the file is not available from the user's storage. An access policy, which indicates what portion of the public has permission to access the file, may be associated with the shared file.

34 Claims, 3 Drawing Sheets

USER CONTENT FEEDS FROM USER STORAGE DEVICES TO A PUBLIC SEARCH ENGINE

FIELD OF THE INVENTION

The present invention relates generally to information management and, more specifically, to allowing user content feeds from storage devices to a Web search engine.

BACKGROUND OF THE INVENTION

Search Engines

Through the use of the Internet and the World Wide Web ("the web"), individuals have access to billions of items of information, which will surely continue to grow. For example, the web provides access to items such as web pages, pictures, songs, videos, bookmark sets, white page listings, people, etc., generally and collectively referred to herein as "searchable items." However, a significant drawback with using the web is that, because there is so little organization to the web, at times it can be extremely difficult for users to locate the particular items that contain the information that is of interest to them. To address this problem, a mechanism known as a "search engine" has been developed to index a large number of searchable items and to provide an interface that can be used to search the indexed information by entering certain words or phases to be queried. These search terms are often referred to as "keywords". A search engine is a computer program designed to find searchable items stored in a computer system, such as the web or such as a user's desktop computer. The search engine's tasks typically include finding searchable items, analyzing searchable items, and building a search index that supports efficient retrieval of searchable items.

Indexes used by search engines are conceptually similar to the normal indexes that are typically found at the end of a book, in that both kinds of indexes comprise an ordered list of information accompanied with the location of the information. An "index word set" of a document is the set of words that are mapped to the document, in an index. For example, an index word set of a web page is the set of words that are mapped to the web page, in a search index. For items that are not indexed, the index word set is empty.

Although there are many popular Internet search engines, they are generally constructed using the same three common parts. First, each search engine has at least one, but typically more, "web crawler" (also referred to as "crawler", "spider", "robot") that "crawls" across the Internet in a methodical and automated manner to locate searchable items of information from around the world. Upon locating an item, the crawler stores the item's URL, and follows any hyperlinks associated with the item to locate other items. Second, each search engine contains information extraction and indexing mechanisms that extract and index certain information about the items that were located by the crawler. In the context of a web page, for example, index information is generated based on the contents of the HTML file associated with the web page. The indexing mechanism stores the index information in large databases that can typically hold an enormous amount of information. Third, each search engine provides a search tool that allows users, through a user interface, to search the databases in order to locate specific searchable items that contain information that is of interest to them, and their location on the web (e.g., a URL).

The search engine interface allows users to specify their search criteria (e.g., keywords) and, after performing a search, provides an interface for displaying the search results. Typically, the search engine orders the search results prior to presenting the search results to the user. The order usually takes the form of a "ranking", where the searchable item with the highest ranking is the item considered most likely to satisfy the interest reflected in the search criteria specified by the user. Once the matching searchable items have been determined, and the display order of those items has been determined, the search engine sends to the user that issued the search a "search results page" that presents information (e.g., URLs, titles, summaries, etc.) about the matching searchable items in the determined display order.

Search engines must generate both relevant and comprehensive search results. Comprehensiveness is generally achieved by crawling web sites and by contracting with content providers to supply content feeds. However, this approach fails to capture most of the world's data, which resides on individual computing devices such as personal computers, rather than on the Internet. Such data is usually inaccessible by any search engine unless the user takes proactive explicit steps to make the data available to the Internet, such as by uploading the data to an indexable website or some other publicly accessible location. Accessibility is generally defined as the ability for content to be reached and downloaded, or otherwise consumed, by any user who has a web browser and an Internet connection.

Exposing Personal Content to the General Public

Users that want to expose personal content to the general public or to a subset of the general public must confront two challenges: how to expose such content for receipt by others and how to publicize the availability of such content. A user might expose personal content in numerous ways. The most basic—and currently the most flexible—way to make personal content available on the web is to set up a website and to post content on a publicly accessible web page. Other examples of how to expose content to the public may include (1) using a paid web hosting or web log (also referred to as a "blog") account on a service which offers hosting to thousands of different customers distributed over hundreds of different physical web servers; (2) using a free hosting service for a web site or a web log, which removes the cost component of web publishing but which sacrifices flexibility and utility because of constraints on file size and file type accepted for posting; (3) upload content to specialized community sites which, while vibrant and active forums for the distribution of information, often take time to join and to learn their community protocols and on which it may be difficult to find the right forum in which to share particular content, and; (4) using a "digital marketplace" to make content available for a fee to receive access to download the source file; (5) using podcasts, which are typically MP3 audio files that are queued for convenient download by users and are synced with the users' portable MP3 player or played directly on the users' computers, and which require both the content contributor to provide suitable hosting environments, bandwidth and storage costs and require the content user to have suitable devices on which to download and replay the content; (6) using newsgroups (e.g., NNTP), which are typically not mainstream, often not archived, have a limited audience, are duplicative, and the information is ephemeral and generally cannot be easily searched; (7) using FTP servers which, by definition, are not part of the web and have limited access via a web browser, require an FTP client and an understanding of server volume structures to use, and are difficult to search; and (8) using the Gopher protocol which by definition is not part of the web, which offers some features not natively supported by the Web but imposes a much stronger hierarchy on stored information and therefore requires careful classification of information so that users can navigate pre-determined file menus to find information.

Furthermore, simply making content accessible is not sufficient. Users also need a means to publicize that such content is available. Examples of how to publicize content to the public may include (1) direct marketing, such as when a user send emails to other users (personal contacts or from a distribution list) with links to the website containing the shared content, which is typically only successful in very limited applications and, unless the mail is passed along (viral marketing), only impacts a small fraction of the potential audience for the content; (2) linking, by which a user may contact the creator of another web site and request that a link to their site (or shared content) be included on a visited web page; (3) submission to search services, by which users may seed search services directly with the web address of the site or content to be shared, with the expectation that the service will eventually send a crawler to this site to index the content and include it in the public search index; and (4) search-engine optimization, an approach which attempts to improve a page's ranking in the query results through the use of a multitude of techniques in page design, keyword vocabulary, cross-linking, and meta-data.

In view of the foregoing, there is a need for better approaches to enable users to expose and publicize personal content to the public and to some subset of the public via the Internet.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

Figure 1:
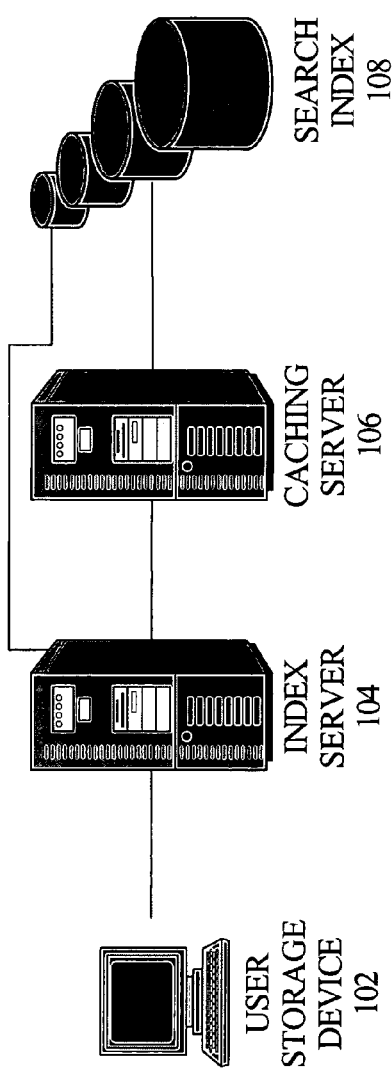
FIG. 1 is a block diagram that illustrates an example operating environment in which embodiments of the invention may be implemented.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Definitions

The following definitions apply to terminology used herein.

An "unhosted file" refers to any file on a storage device for which there is currently no active web server through which the file may be accessed.

A "public search engine" refers to a search engine whose search services are accessible over the Internet, to the public. A public search engine is also referred to herein simply as a "search engine."

Functional Overview of Embodiments

Techniques are described for allowing the delivery of unhosted user content feeds to a public search engine, such as a web search engine. For example, a user can easily "tag" an unhosted file of any type, for sharing with the public via a search engine's search index. A user may identify the file as a file the user wants to share with others by storing the file in a particular directory folder on a user storage device. Once identified as a shared file, the file content is scanned and a corresponding entry is inserted into the search index. The storage location on the user storage device may be captured, and that information added to the search index for linking to the stored file and for serving from the user's storage. Additionally or alternatively to capturing the user's storage location, the file may be uploaded to a caching server, for serving either primarily from the caching server or secondarily from the caching server when the file is not available from the user's storage.

An access policy, which indicates what portion of the public has permission to access the file and under what circumstances (i.e., for free or for a cost), may be associated with the shared file. For example, a user may want to allow a particular file to be accessed by the entire general public with no restrictions, or only allow certain individuals or groups such as friends and family to access the file. Thus, in response to a search for which the file would normally be included in corresponding search results, the access policy is used to determine whether or not the searcher has permission to access the file, and the search results are generated for the searcher accordingly.

A hosting policy, which indicates a certain third party hosting service to which the file is to be forwarded, may be associated with the file. For example, using the hosting policy mechanism, a user may request that image files are posted to a photo sharing service, or that video files are posted to a video sharing service, and the like. Thus, in response to a search for which a file would normally be included in corresponding search results, the search results may include a link to the user's file stored on the certain hosting service.

The techniques described herein enable instant or near real-time publishing of any content to the web by simply creating or storing the content in an indexed area on the "publisher's" own local storage, e.g., the user's hard drive. Thus, no web hosting service, domain name, etc., is required for anyone to publish content to the general public via a popular search engine.

Feeding Unhosted Content to a Search Engine

Embodiments of the invention provide for readily feeding users' unhosted content to a public search engine, such as a web search engine. For non-limiting examples, an unhosted file may comprise any of the various types of searchable items available on the web, such as web pages, pictures, songs, videos, bookmark sets, white page listings, people, etc. With minimal technical expertise and with no change to a user's typical habits with respect to personal computing, a user can expose content for personal access while away from the user's device on which it is stored, and can share the content with a designated group having appropriate access privileges or with the general public. The user is not required to locate and work within a particular website to upload and register content in order to share the content with the public, and the content is quickly indexed into a public search engine for widespread publication and accessibility.

Operating Environment

For Identifying Unhosted Content for a Search Index

FIG. 1 is a block diagram that illustrates an example operating environment in which embodiments of the invention may be implemented. FIG. 1 depicts a user storage device 102, an index server 104, a caching server 106, and a search index 108.

User storage device 102 comprises any device on which a user stores unhosted content that the user wants to share with other parties, and which is communicatively connectable to a network. Non-limiting examples of user storage device 102 include a desktop or laptop computer, a shared network drive, a personal digital assistant, a cell phone, a wireless handheld device, a music player, and the like. In order to implement one or more embodiments of the invention, user storage device 102 needs to support a file system directory in which files can be logically stored, as described in greater detail herein.

User storage device 102 is used to identify the one or more files that a user wants to share with at least some portion of the public, via entry into a public search engine's search index 108. For example, when a user has a file or directory on their user storage device 102 that the user wants to have indexed in a search index 108, according to an embodiment, the user identifies the file or directory via a lightweight client side application or via an interface to a server-side application. Ideally, this user's user storage device 102 is a desktop computer or other storage device that is always connected to the Internet. However, a laptop user, or a user of another storage device that is intermittently connected to the Internet can also publish their files through this system and these techniques.

One non-limiting approach to identifying files and/or entire folders for indexing is to use a plug-in to the user storage device 102 file system, through which respective checkboxes associated with the files and/or folders can be checked and submitted to index server 104. With this approach to identifying entire folders for indexing, a user can identify files for indexing by using normal and typical processes and interactions with a user storage device 102. For example, a user can simply save files for indexing in identified folders, from whatever application to which the files are native, or the user can user drag-and-drop functionality in the user storage device 102 file system to place files into the identified folders, or the user can select and right click on files on the user storage device to identify them as files to be indexed.

Another non-limiting approach to identifying files and/or entire folders for indexing is to use a web browser to navigate to an "Add To Index" (example only) user interface functionality on a search engine's web site, from which the user can browse and select files from the user storage device 102, select file types, and select file folders and/or directories on the user's user storage device 102 to add to search index 108. If both client-side and server-side file management is available, then any actions taken on one side (e.g., the server) should be synchronized with and indicated on the other side (e.g., the client). Regardless of how the file is identified for indexing, according to an embodiment, an indication that the file is identified for sharing is displayed on the user storage device 102 (FIG. 1) on which the unhosted file is stored. Thus, anyone using the user storage device 102 can readily determine which files have been identified for indexing and sharing.

Once files are identified for indexing, either separately or via a folder in which the files are stored, index server 104 is notified and accesses the user storage device 102 file system directory in order to add information about the files to the search index 108. According to an embodiment, index server 104 accesses the user storage device immediately in response to receiving identification of the files for indexing. Alternatively, index server 104 may simply add the files' storage locations on user storage device 102 to a crawling process for later extraction and indexing. Regardless of the timing, index server 104 creates one or more entries in search index 108 for these identified files. Generally, conventional methods can be used to index the files, e.g., by scanning the files, extracting pertinent information, and constructing a search index entry based on the pertinent information from and about the file.

Once indexed, these files can either continue to reside solely on the user's Internet connected user storage device 102, or be automatically cached (reproduced) on a caching server 106. Hence, according to one embodiment, a copy of the indexed files are cached at caching server 106 for later access by remote searchers. For example, as part of the indexing process, index server 104 may store a copy of indexed files at caching server 106.

Access Rights Management

The user who is requesting addition of the files to the search index 108 has full control over the use and access of these files. A robust management console allows the user to maintain when and how the files on user storage device 102 can be accessed. Where an access rights management console is configured for operation may vary from implementation to implementation. For example, an access rights management application may be configured for operation on index server 104 (or some other server) via a network, or may be configured for operation on user storage device 102, or may be configured for synchronous operation on user storage device 102 and index server 104.

From such an access rights management console, the user can manage group access privileges to groups of one or more indexed files, giving unrestricted access to files to the entire general public or restricting access to files to groups of people, such as friends, family, colleagues, etc. A rules engine (e.g., on index server 104 or search server 204) evaluates rules regarding group access privileges and applies the rules evaluation to search results. For example, if access to a file is restricted and if a searcher is not a member of a group that has been given permission to access the file, then in response to a search that would otherwise return the file in corresponding search results, evaluation of the rules determines that the file should not be included in search results for that particular user.

Consequent to the foregoing process, when a searcher is searching for a term in the standard search index 108, the indexed files are found in the search index 108 according to typical search engine processes. Thus, for example, a small business owner would not need to have a hosted website but could simply create a local website on their always-connected desktop computer and set, from the desktop computer, that website directory to be indexed. When a searcher looks for that business name, the locally stored index.html file is served to the searcher and if the small business owner shuts off the computer overnight, the searcher gets a cached copy of the site which has been stored at caching server 106.

For Accessing Personal Content from a Search Interface

Figure 2:
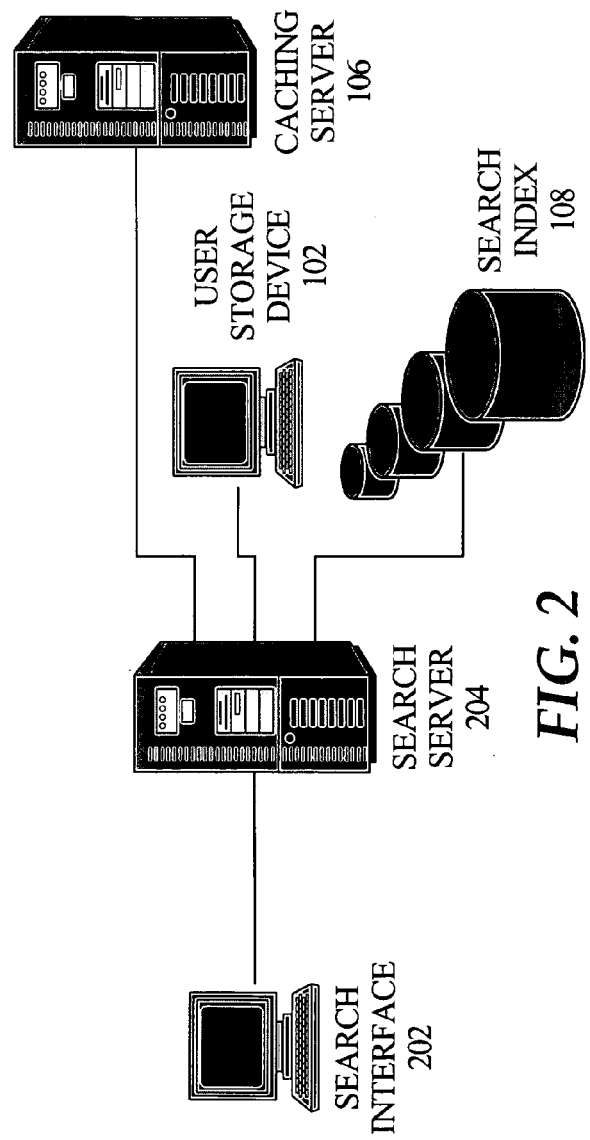
FIG. 2 is a block diagram that illustrates an example operating environment in which embodiments of the invention may be implemented.

FIG. 2 is a block diagram that illustrates an example operating environment in which embodiments of the invention may be implemented. FIG. 2 depicts a search interface 202, a search server 204, user storage device 102, caching server 106, and search index 108.

Search interface 202 comprises a user interface to a search engine, such as a search service's web page through which searchers can enter search keywords or other search criteria. Via the search interface 202, searchers interface with search server 204, which serves lists of matching terms in the form of search results, based on search index 108. Thus, one of the search results may be a link to a previously indexed personal file. According to an embodiment, in which the location of the file on user storage device 102 is indexed, in response to a searcher clicking or otherwise exercising the link in order to access the published file content, search server 204 attempts to access the file on the user storage device 102. If the file is currently accessible from user storage device 102 via a network, then the search server 204 points the searcher directly to the file stored on the user's user storage device 102, whereby a web server residing on user storage device 102 serves the file directly to the searcher. Alternatively, if the user storage device 102 is not configured with a web server, then index server 104 (or another server) may retrieve the file from user storage device 102 in response to the search and serve the file to the searcher. In the scenario in which the file is retrieved from user storage device 102 for serving to the searcher in response to the search, if the file has been updated since it was last accessed, then the index server 104 copies the file and updates the cached copy of the file at caching server 106.

Regardless, if the content is not currently accessible from user storage device, such as when the user's desktop or laptop computer is not connected to the network, then the cached copy of the file on caching server 106 is served to the searcher. Furthermore, according to an embodiment, the file that is inaccessible directly from user storage device 102 is flagged and a count variable is updated regarding the number of unsuccessful attempts to access the file from user storage device 102. Thus, after a certain number of unsuccessful attempts to access the file from user storage device 102, the file is removed from the search index 108.

To access the content, a single use direct URL may be created on the fly during the search process. Alternatively, a secure permanent hidden URL, which is not exposed to the world but via proxies, provides for consistent bookmarkable access to the content. Because most consumers have dynamically assigned IP addresses, their machines are not reliably addressable without a static IP address or DNS mapping to a static IP address. Thus, in scenarios in which the file is intended to be accessible directly from the user storage device 102, according to an embodiment a means for aliasing a dynamic IP address to a static hostname is provided, to allow the user storage device 102 to be more readily accessed from various locations on the Internet.

Furthermore, according to an embodiment, a means is provided for handling authentication of other servers or clients wishing to access the user storage device 102, and a means is provided for implementing a pseudo-static IP address. One approach is for the user to install an application on user storage device 102 and to authorize index server 104 (FIG. 1) to access the user storage device 102. One approach to an authorization process is, for example, automatically setting up during installation a login/password or a digital certificate for the index server's subsequent access to user storage device 102. Further, the user could select a "virtual domain name" provided by the index server 104, and the application could implement a pseudo-static IP address by communicating the current user dynamic IP address to the index server 104, and thereafter monitoring and updating the index server 104 whenever the user IP address changes. In response to the user identifying files and/or folders to be indexed for search by other users, the index server 104 contacts user storage device 102 and presents credentials to authenticate the index server 104. The index server 104 then indexes content in the files and/or folders. In this scenario in which the content is intended to be served from the user storage device 102 if possible, in response to a searcher selecting a file link from search results, the index server 104 constructs a URL using the pseudo static IP address and a string corresponding to the internal storage structure for files on the user storage device 102. The index server 104 may mask this URL to hide the actual IP address and redirect the searcher to this URL, whereby the searcher accesses whatever was located at the URL.

A Method for Feeding Unhosted Content to a Search Index

Figure 3:
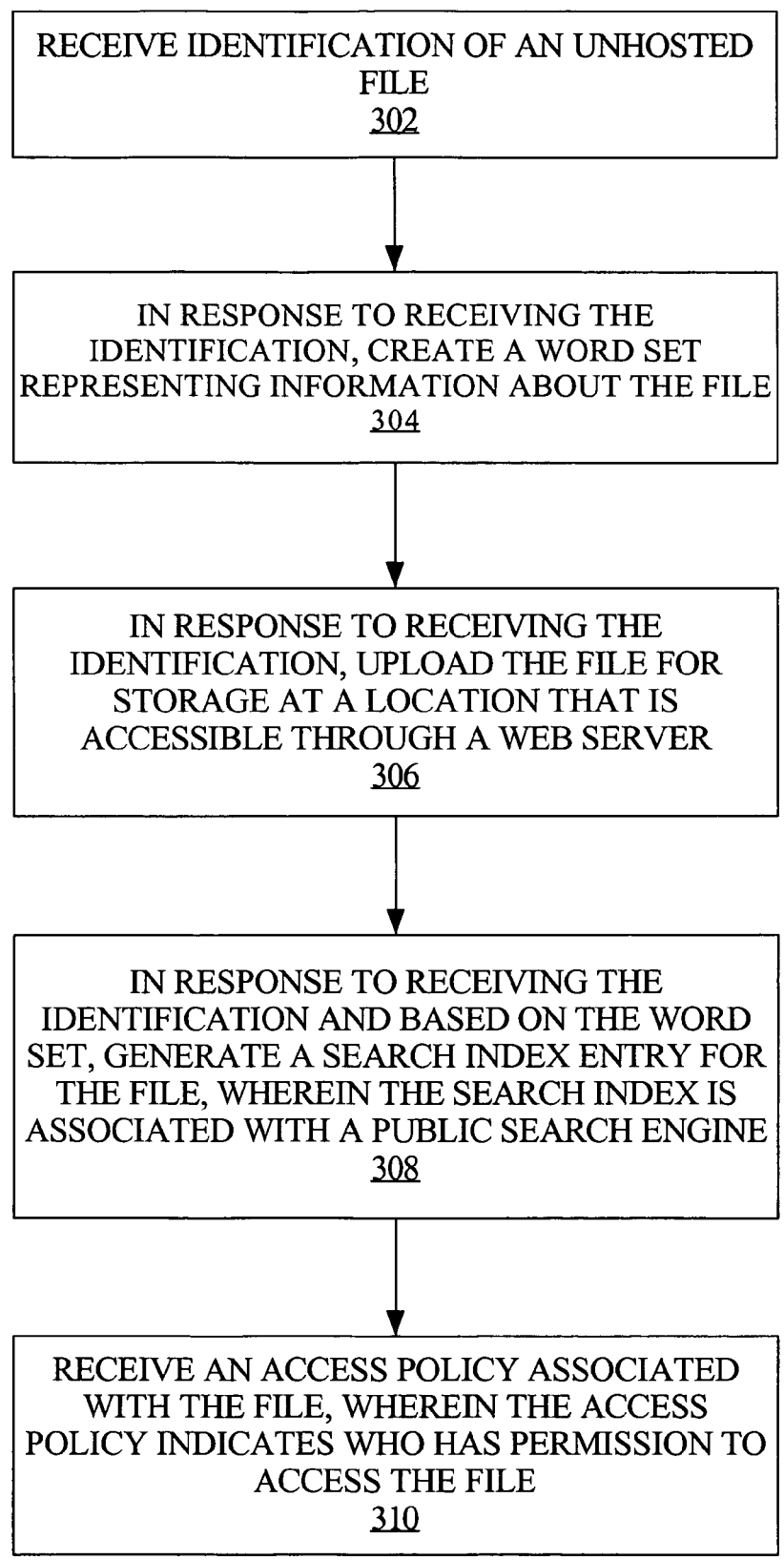
FIG. 3 is a flow diagram that illustrates a method for feeding unhosted content to a search index, according to an embodiment of the invention.

FIG. 3 is a flow diagram that illustrates a method for feeding unhosted content to a search index, according to an embodiment of the invention. The method depicted in FIG. 3 is a computer and/or machine-implemented method in which a computer or machine performs the method, such as by one or more processors executing instructions. For example, the method may be performed on or by a computer system such as computer system 400 of FIG. 4.

At block 302, identification of an unhosted file is received. For example, a user saves a file into a certain directory folder on the user's desktop computer where, through a client application, the user has indicated that files stored in that certain folder are to be indexed into a search index. The type of unhosted file that can be identified for indexing is not restricted to any particular file type, e.g., the file is not restricted to web pages encoded in HTML.

At block 304, a word set representing information about the file is created in response to receiving the identification at block 302. For example, based on typical information extraction techniques used to construct search indexes, pertinent terms appearing in the file as well as metadata associated with the file (e.g., file type, title, size, date last updated, keyword metadata, etc.) are extracted from the file, from which a word set is created.

At block 306, the file is uploaded for storage at a location that is accessible through a web server, in response to receiving the identification at block 302. Recall that the unhosted file that the user identified at block 302 was not accessible through any web server when the user identified it, e.g., the file was simply saved on the user storage device 102 (FIG. 1) with no way of serving it to anyone through a network in response to a request or otherwise. Thus, the file is uploaded so that the file is accessible through a web server, such as to caching server 106 (FIG. 1) or, for example, as an RSS (e.g., Really Simple Syndication) feed to a publication or hosting service (e.g., a photo sharing or video sharing service). Further, according to an embodiment, uploaded files that are not in HTML format are converted to HTML format prior to serving.

At block 308, a search index entry is generated for the file based on the word set created at block 304, in response to receiving the identification at block 302. Recall that the search index in which a entry is created for the file is associated with a public search engine whose search services are available to the public via the Internet. The manner in which the search index entries are added to the public search engine may vary from implementation to implementation. For example, entries for personal, previously unhosted files may be entered directly into search indexes along with all other crawled content, or may be entered into separate search indexes that contain entries only for such personal content. How quickly an identified file is indexed once identified, and how frequently an identified file is refreshed (e.g., revisited and re-indexed), may also vary from implementation to implementation. For example, once a file is uploaded at block 306, the search engine may be notified that the file is available for immediate indexing to the search index.

Because the file is now stored at a location that is accessible through a web server and the file is now indexed in a public search engine, the file is effectively accessible to the general public through searches submitted to the search engine, such as via search interface 202 (FIG. 2). Therefore, in response to receiving search criteria for which the file is determined relevant enough to include in search results (e.g., based on search engine methodologies and algorithms), the search server 204 (FIG. 2) may return search results that include a link to the copy of the file stored at the location that is accessible through the web server, such as the copy stored at the caching server and/or the hosting service server.

However, the user may not want the file available to the general public. Therefore, the user has an option of setting access privileges for the file using an access rights management application or module. According to one embodiment, at block 310 an access policy associated with the file is received, which indicates who has permission to access the file. Therefore, in response to receiving search criteria for which the file is determined relevant enough to include in search results (e.g., based on search engine methodologies and algorithms), the search server 204 (FIG. 2) can identify the searcher and determine, based on the access policy, whether or not the searcher has permission to access the file. If it is determined that the searcher has permission to access the file, then search results that include a link to the file may be returned, such as a link to the copy stored at the caching server and/or the hosting service server. Otherwise, if it is determined that the searcher does not have permission to access the file, then search results returned would not include a link to the file. Another approach is to return search results including information about the file whether or not the searcher has access privileges and, if the searcher does not currently have access privileges, then include in the search results in association with the file, information about contacting the file owner in order to arrange permission to access the file.

An alternative approach to a user identifying specific files for indexing is for a user to grant permission to index server 104 (FIG. 1) to scan and create corresponding word sets for the user's entire user storage device 102 (FIG. 1), i.e., for every file stored on the device. Once the entire user storage device 102 is scanned and/or corresponding index entries created, then the user can indicate (e.g., via the rights management application) which files should actually be indexed in the public search index 108 (FIG. 1) and what access and/or hosting policies should be applied to the indexed files.

According to an embodiment, previously unhosted files that are indexed as described herein are associated, in the search index 108 (FIG. 1), with the user that provided the file. For example, each index entry for such files could include a corresponding user ID. Consequently, the user could use the service and system described herein as a "virtual file cabinet," in which the user "files" documents for universal personal access via the Internet. As such, the user can query the search engine from anywhere, in association with the user's ID, for accessing any personal files that have been indexed according to these techniques.

Identifying Folders for Storing Unhosted Files

Similar to the method described in reference to FIG. 3, according to an embodiment, entire folders can be identified for indexing files stored logically therein. Thus, rather than receiving identification of an unhosted file for indexing, such as at block 302, identification of a folder for storing one or more unhosted files is received. The consequence of identifying such a folder is that unhosted files that are saved in the folder are, by way of being saved in that folder, easily identified for indexing. In response to receiving identification of the folder, a word set is created to represent each corresponding file stored in the folder. For example, index server 104 (FIG. 1) may periodically poll the user storage device 102 (FIG. 1) for newly stored files in the identified folder. Alternatively, saving a file to the identified folder may trigger sending a message from the user storage device 102 to the index server to indicate a new file is stored in an identified folder. In response to discovering files stored in the identified folder, search index entries are generated for each of the files, based on a corresponding word set for the file.

Hence, in response to receiving search criteria for which a file stored in the identified folder is determined relevant enough to include in search results, search results including a link to the file may be returned. According to an embodiment, in response to receiving an indication that the searcher selected the link to the file, the file is uploaded for storage at a location that is accessible through a web server. For example, when the searcher selects the link, index server 104 (FIG. 1) accesses the file from the location at which the file is stored on user storage device 102 (FIG. 1) and serves the file directly from index server 104 to the searcher and/or stores a copy of the file in caching server 106 (FIG. 1) for serving to the searcher.

As with files identified for indexing, folders identified as storing unhosted files for indexing can be associated with an access policy and/or a hosting policy, as described herein in reference to FIG. 3. As with file-based access and hosting policies, search server 204 (FIG. 2) acts according to the access policy and/or hosting policy when search criteria are received for which a file stored in the identified folder is determined relevant enough to be included in search results.

Incenting Sharing of Personal Content with the Public

Public search engine proprietors typically collect revenue for placing advertisements in response to certain content of search results and at times in association with certain searchable items appearing in search results. Thus, revenue is exchanged between parties, e.g., advertisers and search engine proprietors, based to some extent on the content of searchable items. Hence, according to an embodiment, such advertising revenue is shared with users whose files appear above a certain ranking in search results. For example, if a user's formerly unhosted file is indexed and made available to the public as described herein, and if the content of the file is such that the file is ranked in the top ten in a given search results listing, which triggers placement of an advertisement in the search results, then a portion of the revenue that the search engine proprietor receives for placement of the advertisement is distributed to the user who provided the file. Such revenue sharing is likely to serve as an incentive for users to share their personal content with the general public, where the user's sharing of such content ultimately enhances the comprehensiveness of the proprietors search engine services.

Hardware Overview

Figure 4:
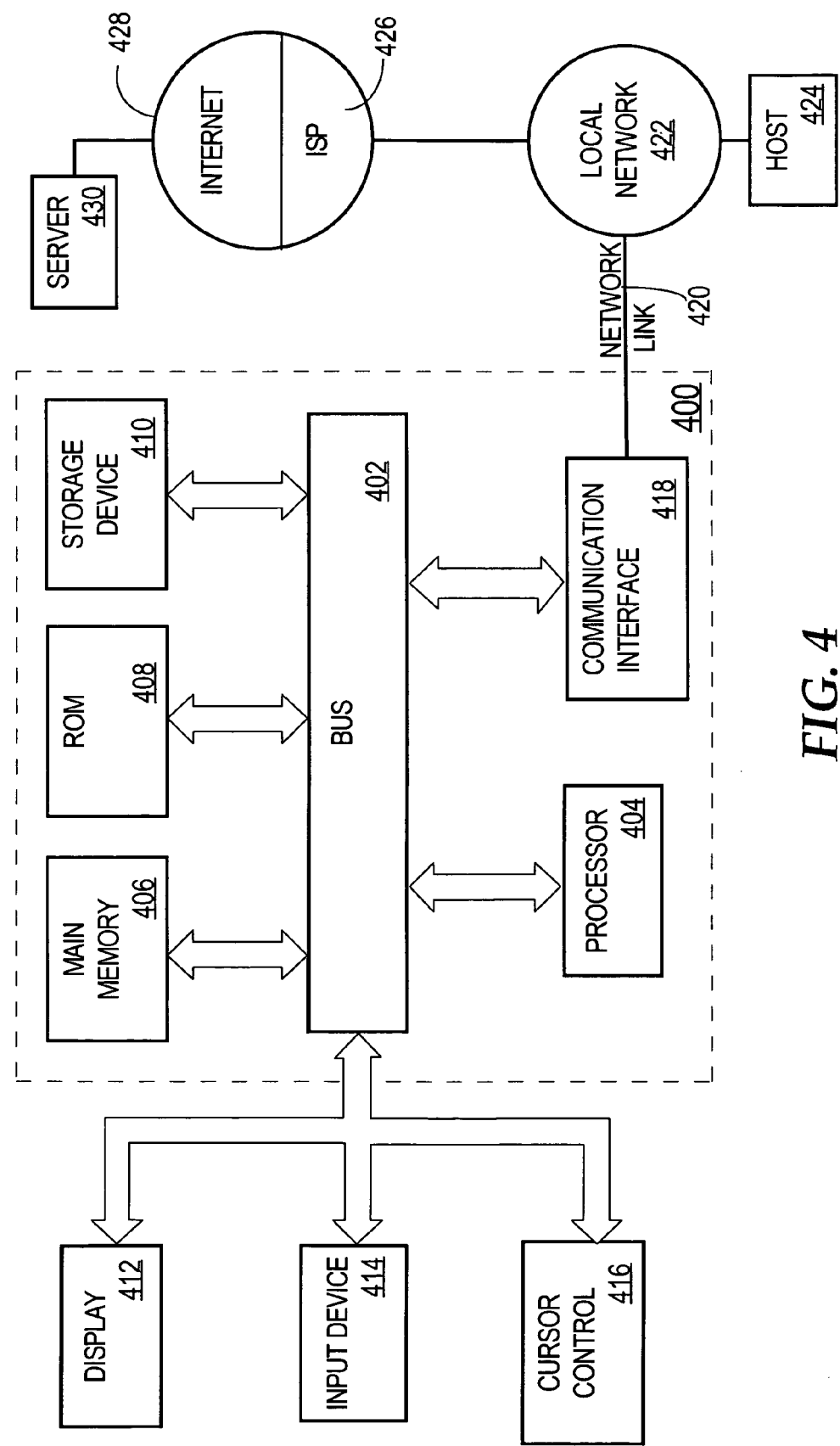
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT) or liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to an embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic or magneto-optical disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be a digital subscriber line (DSL), cable, or integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Alternative embodiments of the invention are described throughout the foregoing specification, and in locations that best facilitate understanding the context of the embodiments. Furthermore, the invention has been described with reference to specific embodiments thereof. It will, however, be evident that various modifications and changes may be made thereto without departing from the broader spirit and scope of the invention.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

What is claimed is:

1. A method:
   receiving, through user input, identification of at least one of:
      an unhosted file; or
      a folder that contains said unhosted file;
   wherein the unhosted file resides on a storage device for which there is currently no active web server through which the unhosted file may be accessed;
   in response to receiving said identification,
      creating a word set representing information about said unhosted file; and
      based on said word set, generating a search index entry for said unhosted file, wherein said search index is associated with a public search engine and identifies said storage device as the location of the unhosted file;
   while the unhosted file is currently on the storage device for which there is currently no active web server through which the unhosted file may be accessed, the public search engine receiving an indication that a searcher has selected a link to said unhosted file from search results provided by the public search engine;
   wherein said link to said unhosted file enables the public search engine to locate the unhosted file on said storage device in response to a user selection of said link, in the search results, to said unhosted file;
   wherein said search results include one or more links to one or more hosted files; and
   wherein said one or more links to said one or more hosted files enable locating said one or more hosted files through web servers that are hosting said one or more hosted files;
   in response to receiving said indication, the public search engine determining whether the unhosted file is currently accessible from said storage device;
   in response to determining that the unhosted file is currently accessible from said storage device, the public search engine causing a copy of the unhosted file to be served from said storage device to the searcher;
   wherein the method is performed by one or more computing devices.

2. The method of claim 1, further comprising:
   in response to receiving said identification, uploading a copy of said unhosted file to a caching server that is associated with the public search engine.

3. The method of claim 2, further comprising:
   in response to receiving search criteria for which said unhosted file is determined relevant enough to include in said search results, returning said search results that include a link to said copy of said unhosted file stored on said caching server.

4. The method of claim 1, further comprising:
   receiving identification of a hosting service; and
   in response to receiving said identification of said hosting service, uploading a copy of said unhosted file to said hosting service.

5. The method of claim 4, further comprising:
   in response to receiving said search criteria for which unhosted said file is determined relevant enough to include in said search results, the public search engine returning said search results that include a link to said copy of said unhosted.

6. The method of claim 1 wherein:
   the identification identifies said folder;
   the folder includes a plurality of unhosted files; and
   in response to receiving said identification, search index entries for each of the plurality of hosted files are added to the search index of said public search engine.

7. The method of claim 6, further comprising:
   receiving an access policy associated with said folder, wherein said access policy indicates who has permission to access files stored in said folder.

8. The method of claim 7, further comprising:
   in response to the public search engine receiving, from a searcher, search criteria for which a file from said plurality of files is determined relevant enough to include in search results,
      determining, based on said access policy, whether said searcher has permission to access files stored in said folder,
      if said searcher has permission to access files stored in said folder, then returning search results that include a link to said file, and
      if said searcher does not have permission to access files stored in said folder, then returning search results that do not include a link to said file.

9. The method of claim 1, wherein:
   said receiving identification comprises receiving said identification from a user, and
   the method further comprising:
   distributing, to said user, advertising revenue associated with search results that include a certain ranking for any of said one or more files.

10. The method of claim 1 further comprising, in response to determining that the unhosted file should be listed in search results, the public search engine creating a single use direct URL to said unhosted file.

11. The method of claim 1 further comprising the public search engine using a secure permanent hidden URL associated with said unhosted file to provide access to the unhosted file.

12. The method of claim 1 further comprising, the public search engine using a static hostname alias of a dynamic IP address to provide access to the unhosted file.

13. The method of claim 1 further comprising receiving, at the public search engine, updates that indicate changes to a dynamic IP address for accessing the unhosted file.

14. The method of claim 1, wherein said one or more links to said one or more hosted files enable locating said one or more hosted files through said web servers without involvement of said public search engine.

15. A method comprising:
receiving, through user input, (a) identification of an unhosted file, and (b) an access policy that indicates who has permission to access said unhosted file;
wherein the unhosted file resides on a storage device for which there is currently no active web server through which the unhosted file may be accessed;
in response to receiving said identification,
creating a word set representing information about said unhosted file;
based on said word set, generating a search index entry for said unhosted file, wherein said search index is associated with a public search engine and identifies said storage device as the location of the unhosted file;
while the unhosted file is currently on the storage device for which there is currently no active web server through which the unhosted file may be accessed, said public search engine receiving, from a searcher, search criteria for which said unhosted file is determined relevant enough to include in search results;
wherein said search results include one or more links to one or more hosted files; and
wherein said one or more links to said one or more hosted files enable locating said one or more hosted files through web servers that are hosting said one or more hosted files;
in response to determining that said unhosted file is relevant enough to include in said search results, performing the steps of:
the public search engine determining, based on said access policy, whether said searcher has permission to access said unhosted file,
if said searcher has permission to access said unhosted file, then returning search results that include a link to said unhosted file, wherein said link to said unhosted file enables the public search engine to locate the unhosted file on said storage device in response to a user selection of said link, in the search results, to said unhosted file; and
if said searcher does not have permission to access said unhosted file, then returning search results that do not include a link to said unhosted file;
wherein the method is performed by one or more computing devices.

16. The method of claim 15 further comprising:
in response to receiving said search criteria for which said unhosted file is determined relevant enough to include in said search results, returning said search results that include a link to said unhosted file stored on a user storage device.

17. The method of claim 15, wherein said one or more links to said one or more hosted files enable locating said one or more hosted files through said web servers without involvement of said public search engine.

18. A computer-readable storage medium storing one or more sequences of instructions which, when executed by one or more processors, causes the one or more processors to perform:
receiving, through user input, identification of at least one of:
an unhosted file; or
a folder that contains said unhosted file;
wherein the unhosted file resides on a storage device for which there is currently no active web server through which the unhosted file may be accessed;
in response to receiving said identification,
creating a word set representing information about said unhosted file; and
based on said word set, generating a search index entry for said unhosted file, wherein said search index is associated with a public search engine and identifies said storage device as the location of the unhosted file;
while the unhosted file is currently on the storage device for which there is currently no active web server through which the unhosted file may be accessed, the public search engine receiving an indication that a searcher has selected a link to said unhosted file from search results provided by the public search engine;
wherein said link to said unhosted file enables the public search engine to locate the unhosted file on said storage device in response to a user selection of said link, in the search results, to said unhosted file;
wherein said search results include one or more links to one or more hosted files; and
wherein said one or more links to said one or more hosted files enable locating said one or more hosted files through web servers that are hosting said one or more hosted files;
in response to receiving said indication, the public search engine determining whether the unhosted file is currently accessible from said storage device;
in response to determining that the unhosted file is currently accessible from said storage device, the public search engine causing a copy of the unhosted file to be served from said storage device to the searcher.

19. The medium of claim 18, wherein the one or more sequences of instructions further comprise instructions which, when executed by one or more processors, causes the one or more processors to perform:
in response to receiving said identification, uploading a copy of said unhosted file to a caching server that is associated with the public search engine.

20. The medium of claim 19, wherein the one or more sequences of instructions further comprise instructions which, when executed by one or more processors, causes the one or more processors to perform:
in response to receiving search criteria for which said unhosted file is determined relevant enough to include in said search results, returning said search results that include a link to said copy of said unhosted file stored on said caching server.

21. The medium of claim 18, wherein the one or more sequences of instructions further comprise instructions which, when executed by one or more processors, causes the one or more processors to perform:
receiving identification of a hosting service; and
in response to receiving said identification of said hosting service, uploading a copy of said unhosted file to said hosting service.

22. The medium of claim 21, wherein the one or more sequences of instructions further comprise instructions which, when executed by one or more processors, causes the one or more processors to perform:
in response to receiving said search criteria for which unhosted said file is determined relevant enough to include in said search results, the public search engine returning said search results that include a link to said copy of said unhosted.

23. The medium of claim 18 wherein:
the identification identifies said folder;
the folder includes a plurality of unhosted files; and
wherein the one or more sequences of instructions further comprise instructions which, when executed by one or more processors, causes the one or more processors to perform:
in response to receiving said identification, search index entries for each of the plurality of hosted files are added to the search index of said public search engine.

24. The medium of claim 23, wherein the one or more sequences of instructions further comprise instructions which, when executed by one or more processors, causes the one or more processors to perform:
receiving an access policy associated with said folder, wherein said access policy indicates who has permission to access files stored in said folder.

25. The medium of claim 24, wherein the one or more sequences of instructions further comprise instructions which, when executed by one or more processors, causes the one or more processors to perform:
in response to the public search engine receiving, from a searcher, search criteria for which a file from said plurality of files is determined relevant enough to include in search results,
determining, based on said access policy, whether said searcher has permission to access files stored in said folder,
if said searcher has permission to access files stored in said folder, then returning search results that include a link to said file, and
if said searcher does not have permission to access files stored in said folder, then returning search results that do not include a link to said file.

26. The medium of claim 18, wherein the one or more sequences of instructions further comprise instructions which, when executed by one or more processors, causes the one or more processors to perform:
receiving said identification from a user, and
distributing, to said user, advertising revenue associated with search results that include a certain ranking for any of said one or more files.

27. The medium of claim 18, wherein the one or more sequences of instructions further comprise instructions which, when executed by one or more processors, causes the one or more processors to perform: in response to determining that the unhosted file should be listed in search results, the public search engine creating a single use direct URL to said unhosted file.

28. The medium of claim 18, wherein the one or more sequences of instructions further comprise instructions which, when executed by one or more processors, causes the one or more processors to perform: the public search engine using a secure permanent hidden URL associated with said unhosted file to provide access to the unhosted file.

29. The medium of claim 18, wherein the one or more sequences of instructions further comprise instructions which, when executed by one or more processors, causes the one or more processors to perform: the public search engine using a static hostname alias of a dynamic IP address to provide access to the unhosted file.

30. The medium of claim 18, wherein the one or more sequences of instructions further comprise instructions which, when executed by one or more processors, causes the one or more processors to perform receiving, at the public search engine, updates that indicate changes to a dynamic IP address for accessing the unhosted file.

31. The medium of claim 18, wherein said one or more links to said one or more hosted files enable locating said one or more hosted files through said web servers without involvement of said public search engine.

32. A computer-readable storage medium storing one or more sequences of instructions which, when executed by one or more processors, causes the one or more processors to perform:
receiving, through user input, (a) identification of an unhosted file, and (b) an access policy that indicates who has permission to access said unhosted file;
wherein the unhosted file resides on a storage device for which there is currently no active web server through which the unhosted file may be accessed;
in response to receiving said identification,
creating a word set representing information about said unhosted file;
based on said word set, generating a search index entry for said unhosted file, wherein said search index is associated with a public search engine and identifies said storage device as the location of the unhosted file;
while the unhosted file is currently on the storage device for which there is currently no active web server through which the unhosted file may be accessed, said public search engine receiving, from a searcher, search criteria for which said unhosted file is determined relevant enough to include in search results;
wherein said search results include one or more links to one or more hosted files; and
wherein said one or more links to said one or more hosted files enable locating said one or more hosted files through web servers that are hosting said one or more hosted files;
in response to determining that said unhosted file is relevant enough to include in said search results, performing the steps of:
the public search engine determining, based on said access policy, whether said searcher has permission to access said unhosted file,
if said searcher has permission to access said unhosted file, then returning search results that include a link to said unhosted file, wherein said link to said unhosted file enables the public search engine to locate the unhosted file on said storage device in response to a user selection of said link, in the search results, to said unhosted file; and
if said searcher does not have permission to access said unhosted file, then returning search results that do not include a link to said unhosted file.

33. The medium of claim 32, wherein the one or more sequences of instructions further comprise instructions which, when executed by one or more processors, causes the one or more processors to perform:
in response to receiving said search criteria for which said unhosted file is determined relevant enough to include in said search results, returning said search results that include a link to said unhosted file stored on a user storage device.

34. The medium of claim 32, wherein said one or more links to said one or more hosted files enable locating said one or more hosted files through said web servers without involvement of said public search engine.

* * * * *